United States Patent
Momosaki et al.

(10) Patent No.: US 7,036,478 B2
(45) Date of Patent: May 2, 2006

(54) ENGINE OPERATED MACHINE SYSTEM

(75) Inventors: Tamotsu Momosaki, Wako (JP); Yutaka Tabata, Wako (JP); Keita Ito, Wako (JP); Toshiharu Nasuno, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 456 days.

(21) Appl. No.: 10/340,830

(22) Filed: Jan. 13, 2003

(65) Prior Publication Data

US 2003/0154946 A1    Aug. 21, 2003

(30) Foreign Application Priority Data

Jan. 18, 2002    (JP)    ............................. 2002-010726

(51) Int. Cl.
*F02B 75/06*    (2006.01)
(52) U.S. Cl. .................................. 123/192.2
(58) Field of Classification Search .............. 123/192.2
See application file for complete search history.

(56) References Cited

U.S. PATENT DOCUMENTS 4,741,303 A    5/1988    Kronich .................... 123/192.2

FOREIGN PATENT DOCUMENTS

| EP | 0 320 576 A | 6/1989 |
| EP | 1 172 529 A1 | 1/2002 |
| JP | 11-125107 | 5/1999 |

*Primary Examiner*—Noah P. Kamen
(74) *Attorney, Agent, or Firm*—Westerman, Hattori, Daniels & Adrian, LLP

(57) ABSTRACT

In an engine operated machine system including a hollow support rod connected at one end to an engine through a vibration insulator, an auxiliary weight is mounted at the other end of a crankshaft for generating a centrifugal force in the same direction as an inertia force of a piston, when the piston reaches top and bottom dead centers. Thus, it is possible to bring a center of gravity of the engine closer to the position of the vibration insulator, thereby suppressing the application of the vibration from the engine to the support rod to the utmost.

2 Claims, 5 Drawing Sheets

ENGINE OPERATED MACHINE SYSTEM

BACKGROUND OF THE INVENTION

1. Field of the Invention

The present invention relates to an engine operated machine system including an engine, a hollow support rod connected at one end to the engine through a vibration insulator, a working instrument supported at the other end of the support rod, a drive shaft disposed within the support rod and connected coaxially to one end of a crankshaft of the engine to drive the working instrument, and a pair of lubrication oil-scattering oil slingers protruding diametrically and secured to the other end of the crankshaft, the vibration insulator being disposed between a center of gravity of the engine and a center of vibration of the engine, and particularly to an engine operated machine system improved so that the support rod is prevented to the utmost from being vibrated by the vibration of the engine.

2. Description of the Related Art

A conventional engine operated machine system is widely used as a power trimmer (for example, see Japanese Patent Application Laid-open No. 11-125107).

The conventional engine operated machine system is operated by an operator who grasps the support rod. The support rod is connected to a casing of the engine so that the operator feels no discomfort due to the vibration of the engine.

If the center of vibration of the engine is located at the position of the vibration insulator, the vibration insulator can sufficiently absorb the vibration of the engine to effectively suppress the vibration of the support rod. In many cases, however, the vibration insulator is generally obliged to be disposed between the center of gravity of and the center of vibration of the engine because of the limitation in the structure.

SUMMARY OF THE INVENTION

Accordingly, it is an object of the present invention to provide an engine operated machine system including a vibration insulator disposed between a center of gravity of and a center of vibration of an engine, wherein the center of vibration of the engine is made closer to the position of the vibration insulator by mounting an auxiliary weight to a crankshaft, thereby minimizing the application of the vibration from the engine to a support rod.

To achieve the above object, according to a first feature of the present invention, there is provided an engine operated machine system comprising: an engine; a hollow support rod connected at one end to the engine through a vibration insulator; a working instrument supported at the other end of the support rod; and a drive shaft disposed within the support rod and connected coaxially to one end of a crankshaft of the engine to drive the working instrument; the vibration insulator being disposed between a center of gravity of the engine and a center of vibration of the engine, wherein an auxiliary weight is mounted at the other end of the crankshaft and generates a centrifugal force in the same direction as an inertia force of a piston, when the piston reaches top and bottom dead centers. The working instrument and the auxiliary weight correspond to a cutting blade 3 and an outer oil slinger 26 in an embodiment of the present invention which will be described hereinafter.

With the first feature, it is possible to bring the center of vibration ultimately close to the position of the vibration insulator by selecting the weight and position of the auxiliary weight, and to enhance the vibration-absorbing effect of the vibration insulator to reduce the application of the vibration to the support rod, thereby alleviating the discomfort provided to an operator.

According to a second feature of the present invention, in addition to the first feature, a counterweight for generating a centrifugal force balanced with the centrifugal force generated by the auxiliary weight, is mounted to the crankshaft between the piston and the auxiliary weight. The counterweight corresponds to an inner oil slinger 27 in the embodiment of the present invention which will be described hereinafter.

With the second feature, the centrifugal forces produced by the auxiliary weight and the counterweight are balanced with each other, and hence it is possible to prevent the generation of an extra rotational vibration due to the provision of the weights.

According to a third feature of the present invention, in addition to the second feature, the auxiliary weight and the counterweight are a pair of lubrication-oil-scattering oil slingers secured in an axially offset manner to the crankshaft, respectively.

With the third feature, the pair of oil slingers also serve as the auxiliary weight and the counterweight, and hence it is unnecessary to mount a special weight, so that it is possible to avoid the complication and an increase in weight of the structure.

The above and other objects, features and advantages of the invention will become apparent from the following description of the preferred embodiment taken in conjunction with the accompanying drawings.

DESCRIPTION OF THE PREFERRED EMBODIMENT

Figure 1:
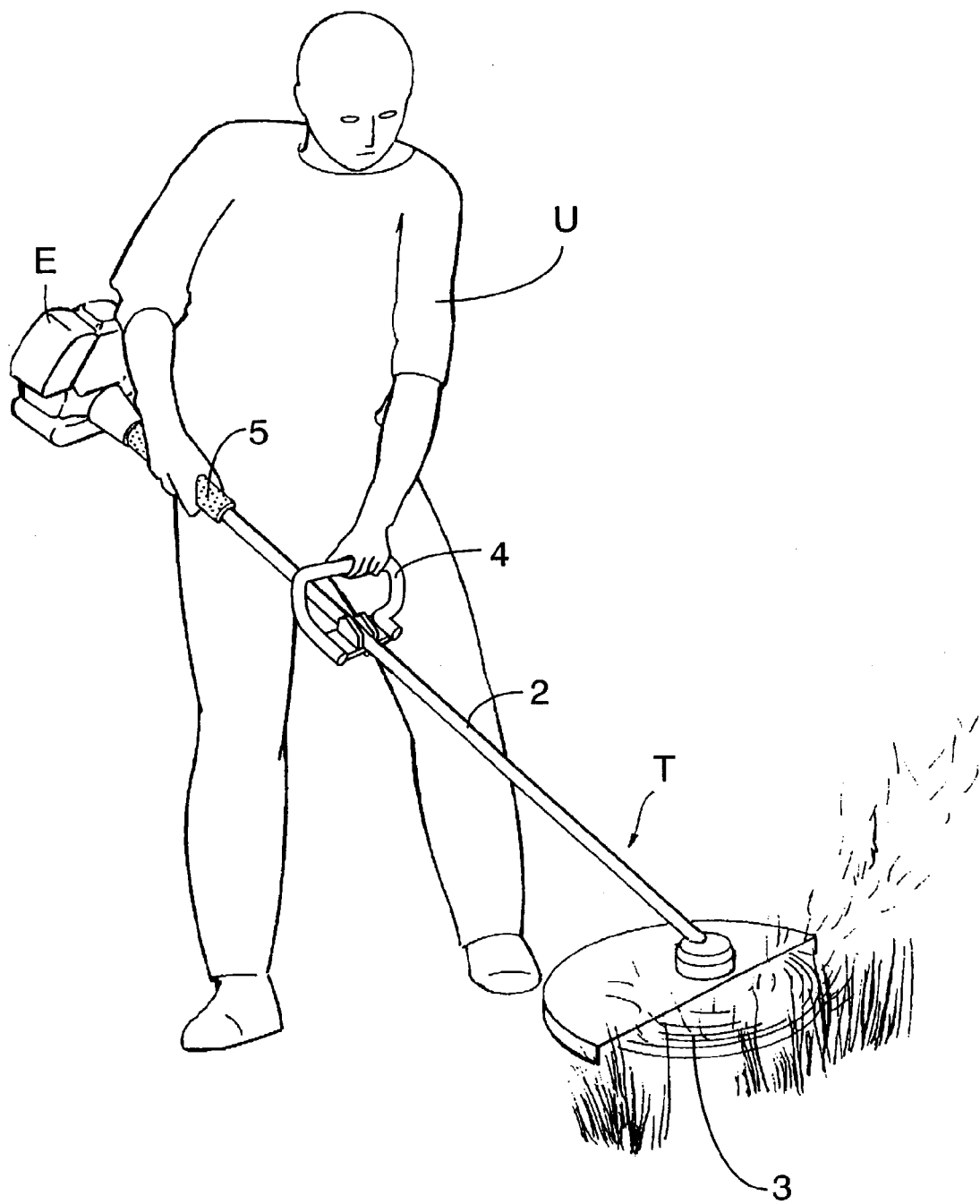
FIG. 1 is a perspective view of a power trimmer according to the present invention shown in a state of operation.
Figure 2:
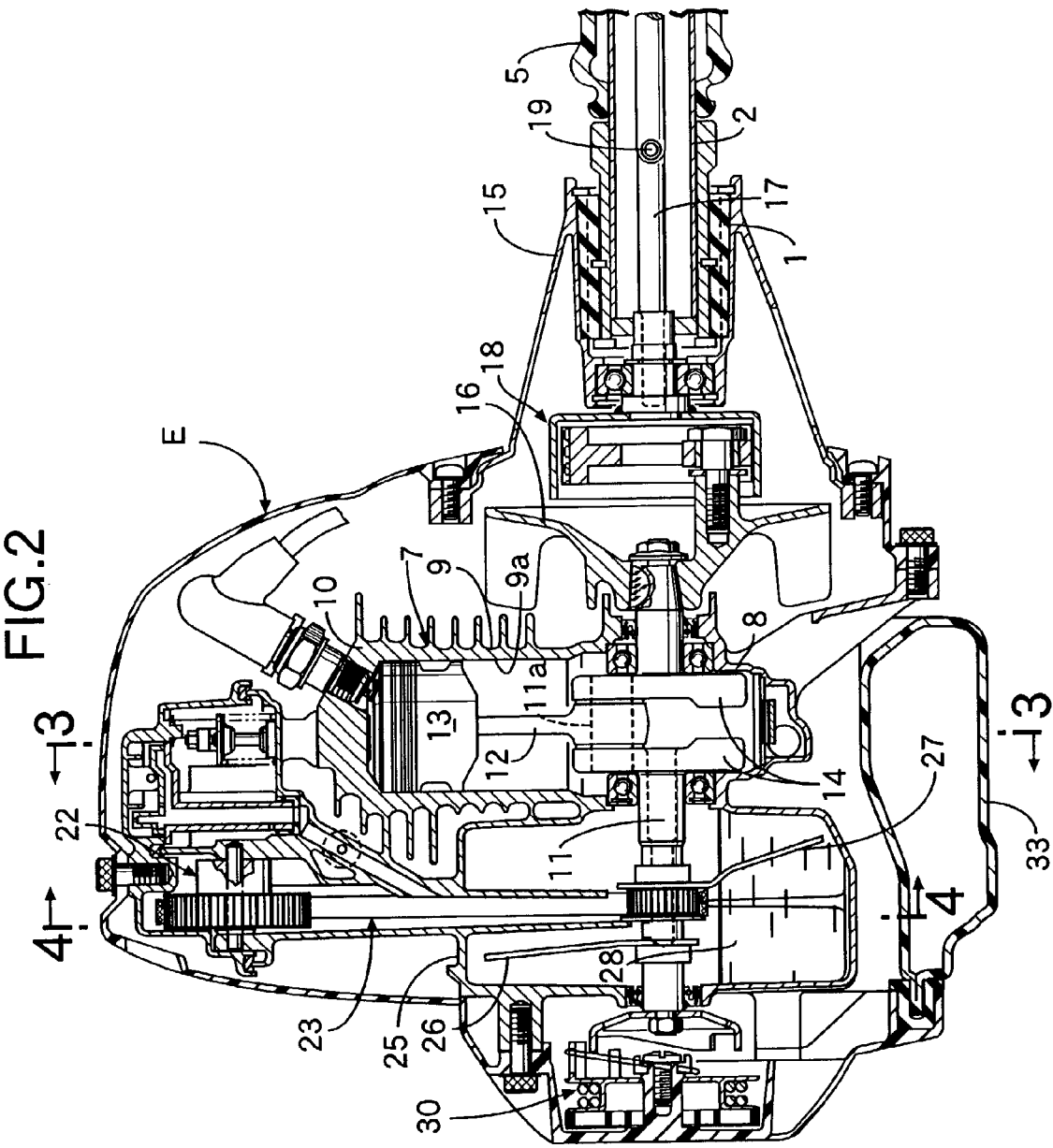
FIG. 2 is a vertical sectional view of an engine area in the power trimmer.

Referring first to FIGS. 1 and 2, a power trimmer T as an engine operated machine system includes a 4-cycle and single-cylinder engine E, a hollow support rod 2 connected at its rear end to a stationary structure of the engine E through a vibration insulator 1, and a cutting blade 3 as a working instrument rotatably supported at a front end of the support rod 2. A handle 4 and a grip 5 to be grasped by an operator U are mounted in a longitudinal arrangement on the support rod 2. A throttle lever (not shown) for controlling a throttle valve of the engine E is mounted in the vicinity of the grip 5.

Figure 3:
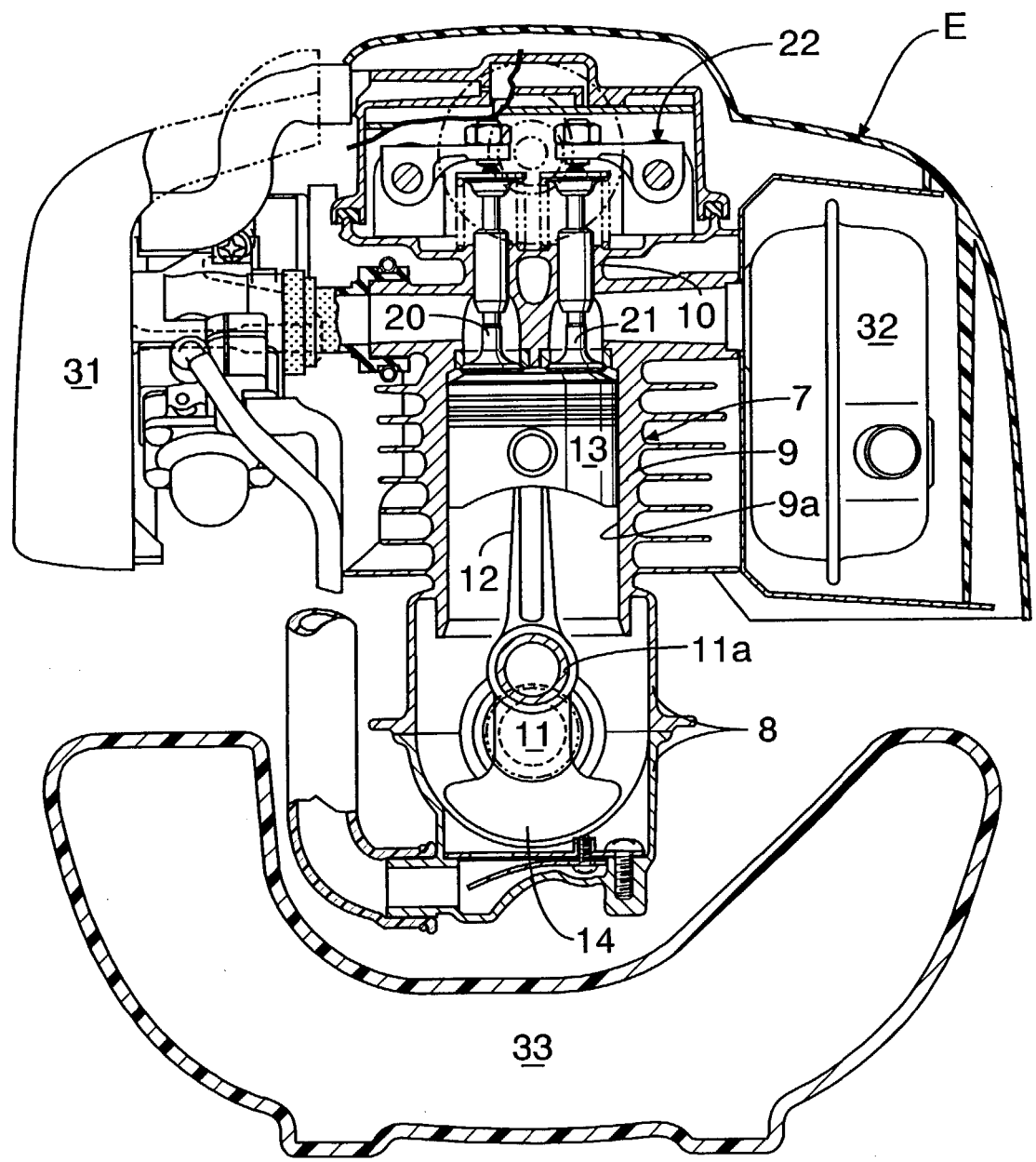
FIG. 3 is a sectional view taken along a line 3—3 in FIG. 2.
Figure 4:
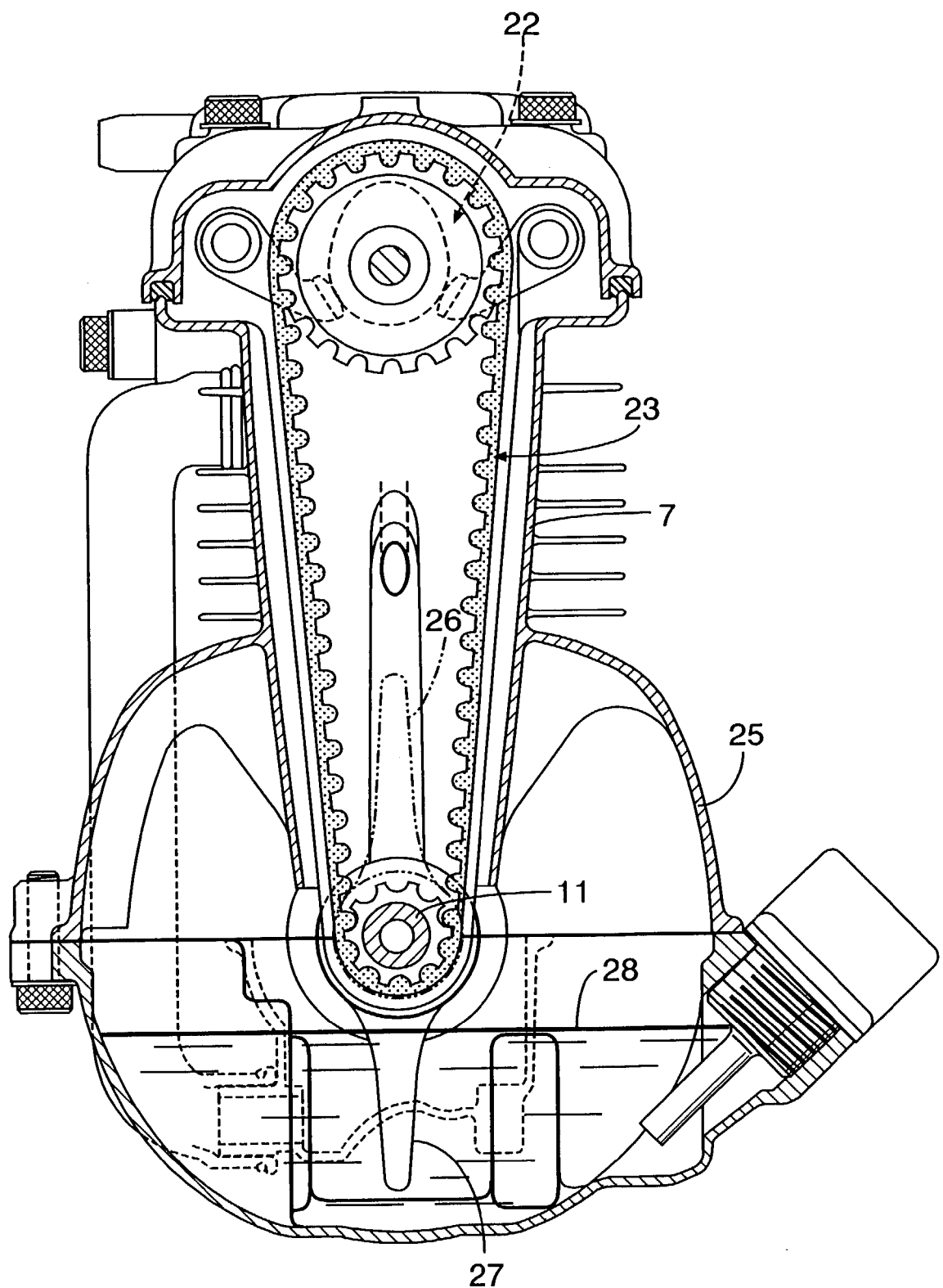
FIG. 4 is a sectional view taken along a line 4—4 in FIG. 2.

As shown in FIGS. 2 to 4, the engine E includes a crankcase 8, an engine body 7 including a cylinder block 9 and a cylinder head 10, a crankshaft 11 supported in the crankcase 8, and a piston 13 connected to a crankpin 11a of the crankshaft 11 through a connecting rod 12 and adapted to reciprocally move within a cylinder bore 9a in the cylinder block 9.

A balance weight 14 is integrally provided on the crankshaft 11 on the side opposite from the crankpin 11a with an axis of the crankshaft 11 therebetween. The balance weight 14 is adapted to generate a centrifugal force balanced with approximately 50% of an inertia force of the piston 13.

A cylindrical support rod holder 15 serving as the stationary structure is secured to a front end of the engine body 7, and a rear end of the support rod 2 is fitted and coupled to the holder 15 through a bush-shaped vibration insulator 1 made of a resilient material such as rubber. There are restrictions in that the weight of the support holder 15 is increased and in that the support holder 15 is formed to be long in the relationship with the position of the grip 5, and for this reason, the vibration insulator 1 is disposed between a center G of gravity of the engine E and a center O of vibration of the engine E due to the inertia force of the piston 13.

A cooling fan 16 also serving as a flywheel is secured to a front end of the crankshaft 11, and connected to a drive shaft 17 disposed in a hollow in the support rod 2 through a centrifugal clutch 18. When the crankshaft 11 is rotated at a predetermined rotational speed or higher, the centrifugal clutch 18 is automatically brought into a connected state, whereby the drive shaft 17 is driven by the crankshaft 11 to rotate the cutting blade 3. A universal joint 19 is incorporated in the drive shaft 17 at a location relatively close to the vibration insulator 1.

A pair of intake and exhaust valves 20 and 21 and a valve-operating cam mechanism 22 for opening and closing the intake and exhaust valves 20 and 21, are mounted in the cylinder head 10. On the other hand, a cylindrical oil tank 25 is integrally connected to a rear end of the engine body 7 opposite from the centrifugal clutch 18, and the crankshaft 11 is passed through the oil tank 25. The valve-operating cam mechanism 22 is connected to the crankshaft 11 located within the oil tank 25 through a belt-type timing transmission mechanism 23.

A pair of oil slingers 26 and 27 secured to the crankshaft 11 are accommodated in the oil tank 25. When the oil slingers 26 and 27 are rotated along with the crankshaft 11, they scatter a lubrication oil 28 stored in the oil tank 25 to produce oil mist. The oil mist produced in the oil tank 25 is fed to the inside of the crankcase 8, the valve-operating cam mechanism 22 and the timing transmission mechanism 23, under a pressure pulsation generated within the crankcase 8 by the reciprocal movement of the piston 13 to lubricate them, and then are returned to the oil tank 25.

Each of the oil slingers 26 and 27 is of a blade shape, as shown in FIGS. 2 and 4. The oil slingers 26 and 27 are fixed to the crankshaft 11 in such a manner that they are axially offset with the timing transmission mechanism 23 therebetween. The oil slinger 26 disposed outside the timing transmission mechanism 23, i.e., opposite from the piston 13, is arranged to generate a centrifugal force $F_2$ in the same direction as an inertia force $F_1$ of the piston 13, when the piston 13 reaches top and bottom dead centers (see FIG. 5). The oil slingers 26 and 27 are disposed to extend in radially opposite directions with respect to the crankshaft 11 so that the centrifugal forces $F_2$, $F_2$ generated by them are balanced with each other.

As shown in FIGS. 2 and 3, a recoil starter 30 is mounted to a reannost portion of the engine E; an air cleaner 31 and an exhaust muffler 32 are mounted to laterally opposite sides of the engine E; and a fuel tank 33 is mounted to a lowermost portion of the engine E.

The operation of this embodiment will be described below.

Figure 5:
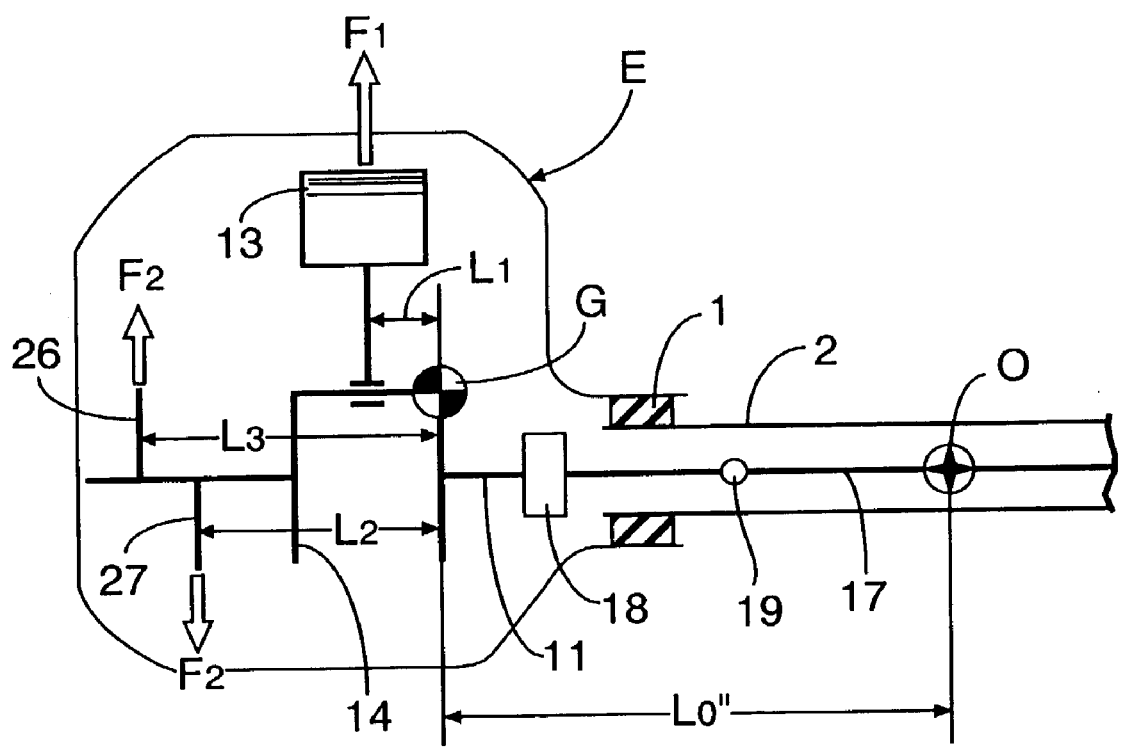
FIG. 5 is a schematic illustration of the engine area, showing a center of gravity and a center of vibration of an engine in the power trimmer.

In FIG. 5, the weight of the engine E is represented by M; an inertia moment around the center G of gravity of the engine E is represented by J; a force product applied to the engine E by the inertia force $F_1$ of the piston 13 is represented by $I_1$; centrifugal forces of the oil slingers 26 and 27 are represented by $F_2$, $F_2$; force products applied to the engine E by the centrifugal forces $F_2$, $F_2$ are represented by $I_2$, $I_2$; a distance from the center G of gravity to the axis of the piston 13 is represented by $L_1$; a distance from the center G of gravity to the inner oil slinger 27 is represented by $L_2$; and a distance from the center G of gravity to the outer oil slinger 26 is represented by $L_3$.

First, supposing that the oil slingers 26 and 27 do not exist, or are not offset axially, a position of the center O of vibration of the engine E due to an inertia force of reciprocal movement of the piston 13 is determined.

The inertia force $F_1$ of the piston 13 generates:

a speed represented by $$v = I_1/M$$

at the center G of gravity of the engine E; and an angular speed represented by $$\omega = I_1 \cdot L_1 / J$$

around the center G of gravity. A speed v' at a point O spaced apart by a distance L' from the center G of gravity is represented by $$v' = v - L' \cdot \omega = (I_1/M) - (I_1 \cdot L_1 \cdot L'/J),$$

and a point where v' is zero is the center O of vibration. A distance $L_0'$ from the center G of gravity to the center O of vibration is determined as follows:

$$0 = v - L_0' \cdot \omega = (I_1/M) - (I_1 \cdot L_1 \cdot L'/J)$$

$$L_0' = J/M \cdot L_1$$

Then, a position of the center O of vibration of the engine E due to the inertia force of the reciprocal movement of the piston 13 is determined in consideration of the presence of the oil slingers 26 and 27 disposed in an offset manner as described above.

The inertia force $F_1$ of the piston 13 and the centrifugal forces $F_2$, $F_2$ of the oil slingers 26 and 27, generates:

a speed represented by $$v = (I_1 + I_2 - I_2)/M = I_1/M$$
$$= I_1/M$$

at the center G of gravity of the engine E; and an angular speed represented by $$\omega = (I_1 \cdot L_1 + I_2 \cdot L_3 - I_2 \cdot L_2)/J$$

around the center G of gravity. A speed v" at a point O spaced apart by a distance L" from the center G of gravity, is represented by $$v'' = v - L'' \cdot \omega$$
$$= (I_1/M) - L''(I_1 \cdot L_1 + I_2 \cdot L_3 - I_2 \cdot L_2)/J$$

and a distance $L_0''$ from the center G of gravity to a point where $v''$ is zero, i.e., the center O of vibration, is determined as follows:

$$0 = (I_1/M) - L''(I_1 \cdot L_1 + I_2 \cdot L_3 - I_2 \cdot L_2)/J$$

$$L_0'' = I_1 \cdot J/M\{I_1 \cdot L_1 + I_2(L_3 - L_2)\}$$

As apparent from the forgoing, $L_0'' < L_0'$ is established. Namely, according to the above-described embodiment, the center O of vibration is closer to the position of the vibration insulator 1 by a distance ($L_0' - L_0''$), as compared with the case where the oil slingers 26 and 27 do not exist, or are not offset axially. Therefore, it is possible to set the center O of vibration at a location unlimitedly close to the position of the vibration insulator 1 by selecting the weights and the offset distance of the oil slingers 26 and 27. As a result, it is possible to enhance the vibration-absorbing effect of the vibration insulator 1 to reduce the application of the vibration to the support rod 2, thereby alleviating the discomfort provided to the operator U.

Moreover, the centrifugal forces of the pair of oil slingers 26 and 27 are balanced with each other, and hence it is possible to prevent the generation of an extra rotational vibration due to the provision of the oil slingers 26 and 27.

Additionally, the oil slingers 26 and 27 function as weights for bringing the center O of vibration of the engine E close to the position of the vibration insulator 1, while scattering the lubrication oil 28 in the oil tank 25 to produce the oil mist for lubricating various portions of the engine E, and hence it is not necessary to mount a special weight, and the complication and an increase in weight of the structure cannot be brought about.

The present invention is not limited to the above-described embodiment, and various modifications in design may be made without departing from the spirit and scope of the invention defined in the claims.

What is claimed is:

1. An engine operated machine system comprising: an engine; a hollow support rod connected at one end to said engine through a vibration insulator; a working instrument supported at the other end of said support rod; and a drive shaft disposed within said support rod and connected coaxially to one end of a crankshaft of said engine to drive said working instrument; said vibration insulator being disposed between a center of gravity of said engine and a center of vibration of said engine, wherein an auxiliary weight is mounted at the other end of the crankshaft and generates a centrifugal force in the same direction as an inertia force of a piston, when said piston reaches top and bottom dead centers, and further wherein a counterweight, for generating a centrifugal force balanced with the centrifugal force generated by said auxiliary weight, is mounted to the crankshaft between the piston and said auxiliary weight.

2. An engine operated machine system according to claim 1, wherein said auxiliary weight and said counterweight are a pair of lubrication-oil-scattering oil slingers secured in an axially offset manner to the crankshaft, respectively.

* * * * *